US012681133B2

(12) United States Patent
Nazarenko

(10) Patent No.: US 12,681,133 B2
(45) Date of Patent: Jul. 14, 2026

(54) RADAR BLANKING USING DYNAMIC SUBINTERVAL NOISE FLOOR ESTIMATION

(71) Applicant: BAE Systems Information and Electronic Systems Integration Inc., Nashua, NH (US)

(72) Inventor: Nicholas Nazarenko, Auburn, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 107 days.

(21) Appl. No.: 18/953,852

(22) Filed: Nov. 20, 2024

(65) Prior Publication Data

US 2026/0140222 A1 May 21, 2026

(51) Int. Cl.
*G01S 7/02* (2006.01)

(52) U.S. Cl.
CPC ................................... *G01S 7/023* (2013.01)

(58) Field of Classification Search
CPC .................... G01S 7/023; G01S 7/292–7/2927
See application file for complete search history.

(56) References Cited

U.S. PATENT DOCUMENTS

| | | | |
|---|---|---|---|
| 6,297,764 B1 | 10/2001 | Wormington et al. | |
| 10,432,253 B2 * | 10/2019 | Soualle | ................... G01S 19/22 |
| 2004/0258144 A1 * | 12/2004 | Omori | ....................... H04L 1/20 |
| | | | 375/224 |
| 2011/0291875 A1 * | 12/2011 | Szajnowski | ............. G01S 13/34 |
| | | | 342/70 |
| 2017/0170867 A1 * | 6/2017 | Soualle | ................... G01S 19/29 |
| 2022/0260709 A1 | 8/2022 | Lee | |
| 2023/0067492 A1 | 3/2023 | Pattar et al. | |
| 2023/0123105 A1 * | 4/2023 | Iezzi | ................... H04B 1/1081 |
| | | | 375/346 |
| 2024/0319336 A1 | 9/2024 | Do et al. | |

OTHER PUBLICATIONS

International Search Report, PCT/US25/55882, mailed Feb. 2, 2026, 11 pages.

* cited by examiner

*Primary Examiner* — Peter M Bythrow
(74) *Attorney, Agent, or Firm* — Scott J. Asmus

(57) ABSTRACT

Techniques are provided for radar blanking using dynamic subinterval noise floor estimation. A radar blanking system implementing the techniques according to an embodiment includes a noise floor estimator configured to extract noise samples from a segment of in-phase (I) and quadrature (Q) input signal samples. The system also includes a blanking threshold calculator configured to calculate blanking thresholds based on statistics of the noise samples, the statistics including a mean of the noise samples and a standard deviation of the noise samples. The system further includes a blanking processor configured to select a subset of the IQ input signal samples that exceed the blanking thresholds and replace the selected subset of the IQ input signal samples with the mean of the noise samples to generate a blanked signal.

20 Claims, 9 Drawing Sheets

100

Blanker System Input
200

Blanker System Output
250

Radar Blanking System
150

Noise Floor Estimator
310a

Noise Floor Estimator
310b

N Buffered
IQ Samples
305

N Sample
Magnitudes
505

Magnitude
Calculator
500

RCD
Calculator
510

Noise
Threshold
515

Noise Sample
Selector
520

M Noise
IQ Samples
315b

Blanking Threshold Calculator
330

Blanking Processor
340

800

Extract noise samples from input signal.
810

Noise Floor
Estimator
310

Calculate blanking threshold based on noise sample statistics.
820

Blanking
Threshold
Calculator
330

Replace input signal samples that exceed blanking threshold with mean of noise samples.
830

Blanking
Processor
340

Processing Platform
900

RADAR BLANKING USING DYNAMIC SUBINTERVAL NOISE FLOOR ESTIMATION

STATEMENT OF GOVERNMENT INTEREST

This invention was made with United States Government assistance under Contract No. 20-C-3110. The United States Government has certain rights in this invention.

FIELD OF DISCLOSURE

The present disclosure relates to radar receivers, and more particularly to radar blanking using dynamic subinterval noise floor estimation.

BACKGROUND

In wireless radio frequency (RF) communications links, for both commercial and military applications, it is not always possible to operate in an interference free environment. Radar signals are ubiquitous in many different frequency bands. Such radar signals are one example of a high power pulsed interferer that is capable of adversely impacting the ability of RF receivers to acquire and process signals of interest on communications channels.

Figure 1:
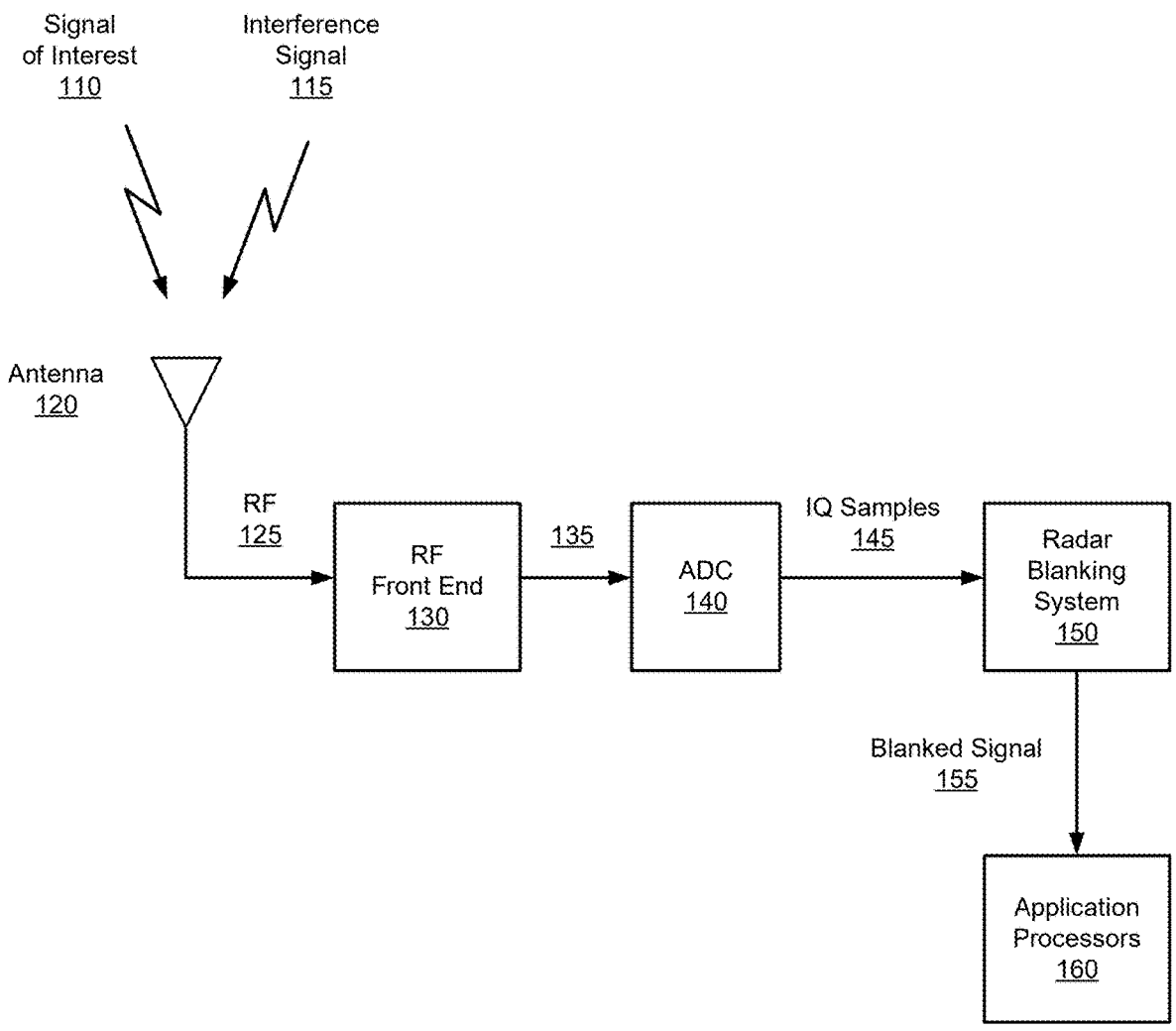
FIG. 1 illustrates an implementation of a radar blanking system, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for radar blanking using dynamic subinterval noise floor estimation. As noted above, in wireless RF communications links, for both commercial and military applications, it is not always possible to operate in an interference free environment. Radar signals are ubiquitous in many frequency bands and are one example of a relatively high power pulsed interferer that is capable of adversely impacting the ability of RF receivers to acquire and process signals of interest on communications channels.

Radar blanking techniques can be used to detect and mitigate the effects of high power pulsed interference, for a given blanking interval, by blanking out the radar receiver during periods of interference. In dense interference environments, however, where signals from multiple radars can cause significant co-channel interference, traditional radar blanking methods are often unable to adequately mitigate the interference.

Some existing radar blanking techniques use frequency domain adaptive filtering, which can be computationally expensive since a Fourier transform (or equivalent) computation is required. Other techniques use time domain thresholding based on statistics collected over a full blanking duration. This approach, however, allows the interfering signals to corrupt the threshold computations. By using a noise floor subinterval to compute the blanking threshold, however, the statistics of the radar interference are not included in computation of the threshold, which can yield superior blanking performance over traditional methods, as described below.

To this end, and in accordance with an embodiment of the present disclosure, a blanking threshold is computed, to determine when the radar should be blanked, based on a dynamically selected noise floor subinterval. Dynamic selection of noise-only samples within the noise floor subinterval enables computation of statistics, for the determination of the blanking threshold, which can more effectively mitigate or eliminate or otherwise reduce the adverse impacts of the interference, as will be described in greater detail below.

In accordance with an embodiment, a system implementing the techniques for radar blanking, using dynamic subinterval noise floor estimation, includes a noise floor estimator configured to extract noise samples from a segment of in-phase (I) and quadrature (Q) input signal samples. The system also includes a blanking threshold calculator configured to calculate blanking thresholds based on statistics of the noise samples. The statistics include a mean of the noise samples and a standard deviation of the noise samples. The system further includes a blanking processor configured to select a subset of the IQ input signal samples that exceed the blanking thresholds and replace that selected subset of the IQ input signal samples with the mean of the noise samples, to generate a blanked signal.

It will be appreciated that the techniques described herein may provide improved, interference mitigation, using a dynamic noise subinterval, compared to other methods that use frequency domain adaptive filtering or time domain thresholding based on statistics collected over a full blanking duration. Numerous embodiments and applications will be apparent in light of this disclosure.

System Architecture

FIG. 1 illustrates an implementation 100 of a radar blanking system 150, in accordance with certain embodiments of the present disclosure. The implementation 100 is shown to include an antenna 120, an RF front end 130, an analog to digital converter (ADC) 140, a radar blanking system 150, and one or more application processors 160.

The antenna (or antenna array) 120 is configured to receive RF signals from any number of sources which may include, for example, signals of interest 110 along with interference signals 115 that may be present in the environment.

The antenna 120 provides the received RF signal 125 to an RF front end 130 that, in some embodiments, is configured to convert the received RF signal down to an intermediate frequency (IF) signal or a baseband signal and perform any suitable filtering and amplification.

The ADC 140 is configured to convert the analog signal 135 provided by the RF front end 130 into a digital signal comprising in-phase and quadrature data samples (IQ samples) 145.

The radar blanking system 150 is configured to generate a blanked signal 155 to reduce or eliminate the interfering signal, as will be described in greater detail below. The blanking of interfering signals 115 can serve to avoid false detections of signals of interest 110 and avoid data corruption within those signals of interest.

The application processors 160 are configured to process the blanked signal 155 for application specific purposes, for example to decode a communication signal or other data from the received signal of interest 110.

Figure 2:
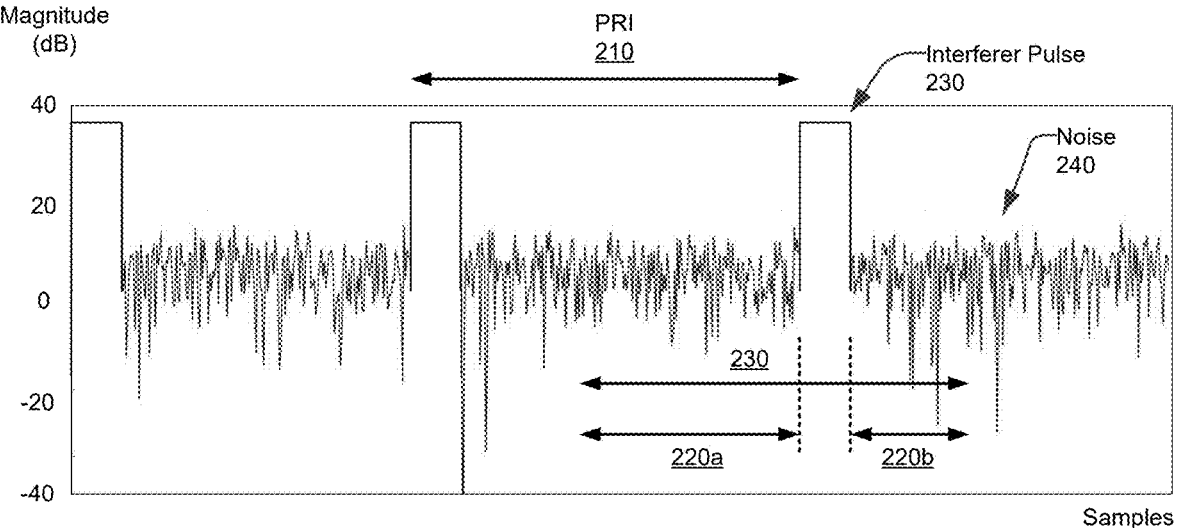
FIG. 2 illustrates inputs and outputs of the radar blanking system of FIG. 1, in accordance with certain embodiments of the present disclosure.
Figure 2:
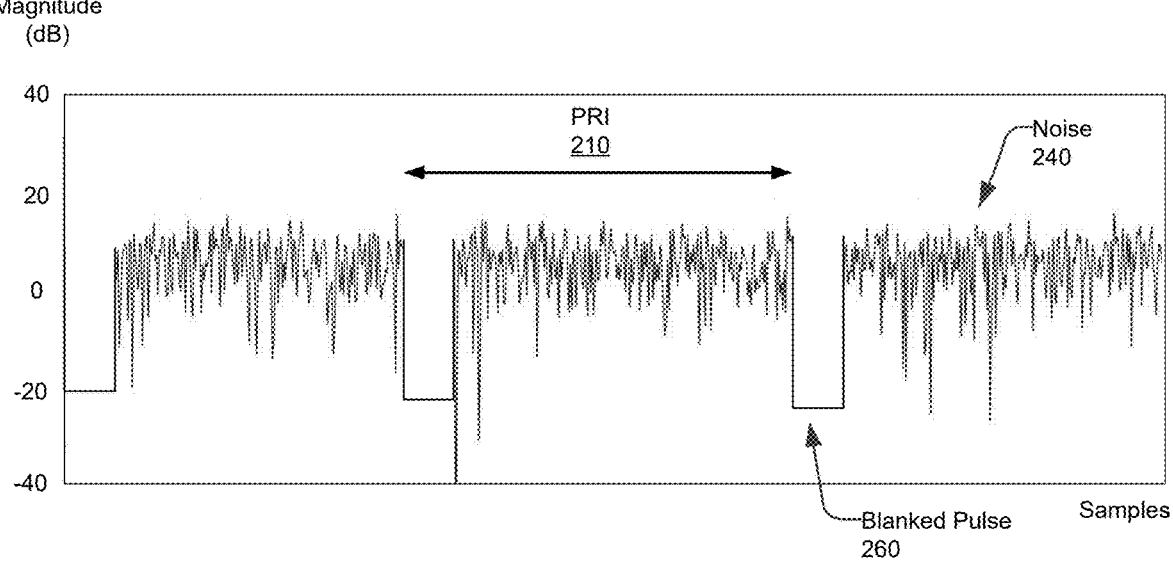

FIG. 2 illustrates inputs and outputs of the radar blanking system 150 of FIG. 1, in accordance with certain embodiments of the present disclosure. The input 200 to the blanker system is shown to include a pulsed interference signal 230 that is received in combination with underlying noise 240. The noise 240 may also include signals of interest such as spread spectrum signals of relatively low power (e.g., buried in the noise). The pulsed interference signal 230 is shown to repeat at a pulse repetition interval (PRI) 210, as might be expected, for example, from a pulsed radar that is present and emitting energy in the environment.

Although the times at which the interfering pulse arrives may be unknown, the PRI of the interferer may be known or anticipated (e.g., based on intelligence sources or the like). Thus, the blanking interval 230 can be located at any point in time but may be set to approximately equal the duration of the PRI 210. In some embodiments, the blanking interval may be set to a length that depends on characteristics of the signal of interest for which detection is desired, but it will still be desirable to set the blanking interval so that only one interfering pulse is expected to be present in that interval, if possible. The noise floor subinterval 220 is also shown in this plot as the time segments 220a, 220b, within the blanking interval 230, during which the interferer is not present.

The radar blanking system is configured to blank out the pulsed interference signal 230, as shown in the blanker system output plot 250. In this plot, the interfering pulses 230 are blanked 260 by replacing the pulse samples with the mean of the samples of the estimated noise floor, which is typically a relatively small value. The estimated noise floor is the region that comprises the dynamically determined noise floor subinterval 220, as will be explained in greater detail below.

Figure 3:
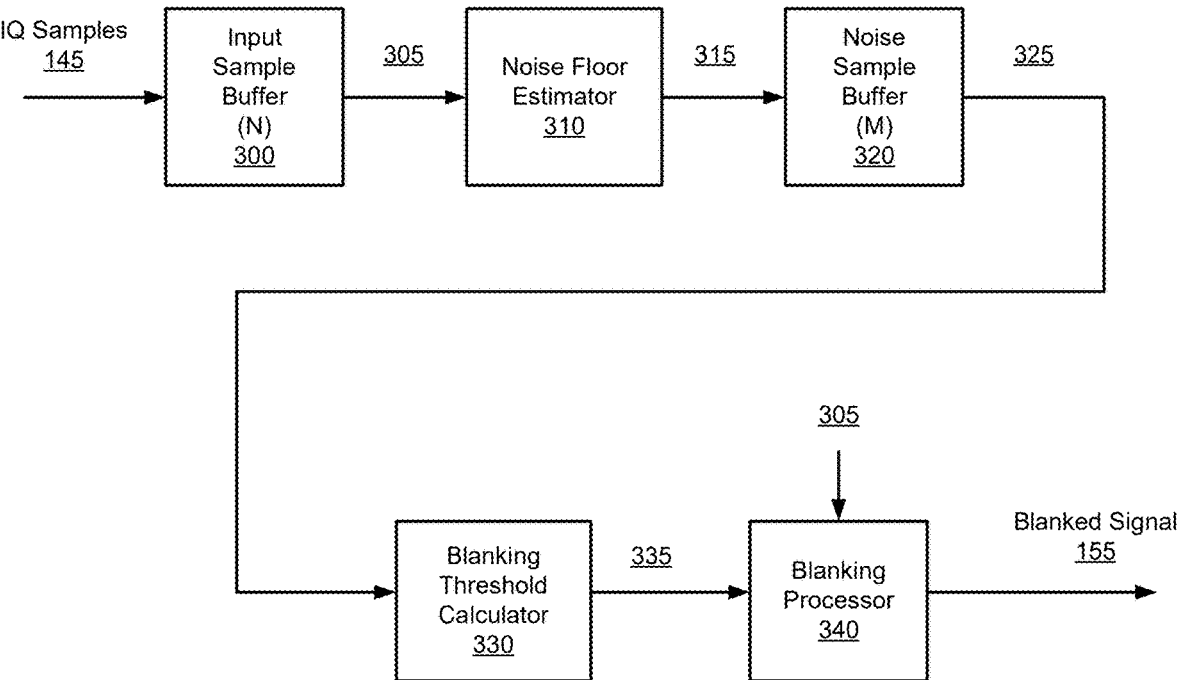
FIG. 3 is a block diagram of the radar blanking system of FIG. 1, configured in accordance with certain embodiments of the present disclosure.

FIG. 3 is a block diagram of the radar blanking system 150 of FIG. 1, configured in accordance with certain embodiments of the present disclosure. The radar blanking system 150 is shown to include an input sample buffer 300, a noise floor estimator 310, a noise sample buffer 320, a blanking threshold calculator 330, and a blanking processor 340.

The input sample buffer 300 is configured to store a segment of the IQ input signal samples 145. The length of the segment is referred to as the blanking duration interval 230. In some embodiments, the blanking duration interval is of length N samples and is based on the PRI of an interfering signal 115 to be blanked.

The noise floor estimator 310 is configured to extract noise samples 315 from the segment 305 of IQ input signal samples stored in the input sample buffer 300. The number of extracted noise samples (M) equals the length in samples of the noise floor subinterval (e.g., 220 of FIG. 2). In some embodiments, M is selected based on a duty cycle of the interfering signal. In some embodiments, M is selected such that the ratio of M to N is in the range of 0.7 to 0.8 (e.g., M is 70 to 80 percent of N). For example, if it is known or expected that the duty cycle of the interferer is 25 percent, then the ratio of M to N may be set to 75 percent. The selection of the value of M involves a tradeoff between obtaining more samples to improve the accuracy of the statistics, versus corrupting the statistics by including a portion of the interfering pulse in the noise subinterval. In some embodiments, the value of M may be selected based on specified performance requirements for a given application.

Two embodiments of the noise floor estimator are disclosed which provide alternative methods for selecting data from the blanking interval to include in the noise floor subinterval. Operation of the noise floor estimator 310 for each embodiment, 310a and 310b, will be described in greater detail below in connection with FIGS. 4 and 5.

The noise sample buffer 320 is configured to store the M extracted noise samples 315.

The blanking threshold calculator 330 is configured to calculate a blanking threshold 335 based on statistics of the noise samples 325 stored in the noise sample buffer 320. In some embodiments, the statistics include a mean of the noise samples and a standard deviation of the noise samples. Operation of the blanking threshold calculator 330 will be described in greater detail below in connection with FIG. 6.

The blanking processor 340 is configured to select a subset of the IQ input signal samples 305 that exceed the blanking threshold 335 and replace those samples with the mean of the noise samples, to generate the blanked signal 155. Operation of the blanking processor 340 will be described in greater detail below in connection with FIG. 7.

Figure 4:
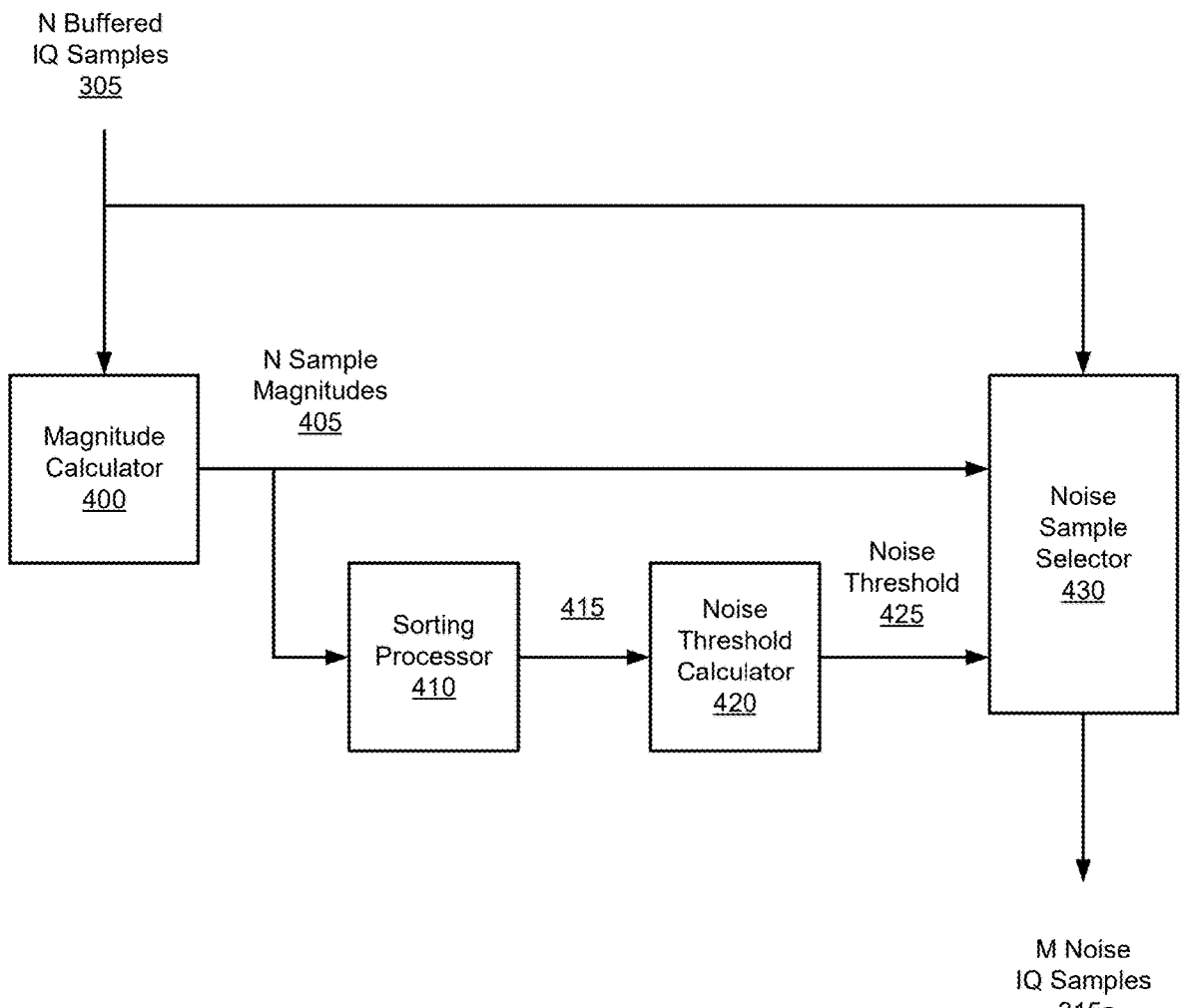
FIG. 4 is a block diagram of a noise floor estimator of the radar blanking system of FIG. 3, configured in accordance with certain embodiments of the present disclosure.

FIG. 4 is a block diagram of a noise floor estimator 310a of the radar blanking system 150 of FIG. 3, configured in accordance with certain embodiments of the present disclosure. The noise floor estimator 310a, is one example of a noise floor estimator, and is shown to include a magnitude calculator 400, a sorting processor 410, a noise threshold calculator 420, and a noise sample selector 430.

The magnitude calculator 400 is configured to calculate N sample magnitudes 405 of the N buffered IQ input signal samples 305 of the segment (e.g., of the blanking duration interval).

The sorting processor 410 is configured to sort the N calculated magnitudes 405, for example from lowest magnitude value to highest magnitude value, or vice versa, to generate a sorted list of magnitudes 415.

The noise threshold calculator 420 is configured to calculate a noise threshold 425 based on a number, M, of the smallest calculated magnitudes from the sorted list of magnitudes 415. For example, if the magnitudes are sorted from the lowest magnitude value to the highest magnitude value, the noise threshold 425 is selected as the $M^{th}$ entry in the sorted list of magnitudes 415.

The noise sample selector 430 is configured to extract the noise samples from the N buffered IQ input signal samples 305 based on a comparison of the calculated magnitudes 405 to the noise threshold 425, to generate the M noise IQ samples 315*a*. For example, if the magnitude of an IQ sample 305 is less than the noise threshold 425, then that IQ sample is selected as one of the noise samples 315*a*, for storage in the noise sample buffer 320.

Figure 5:
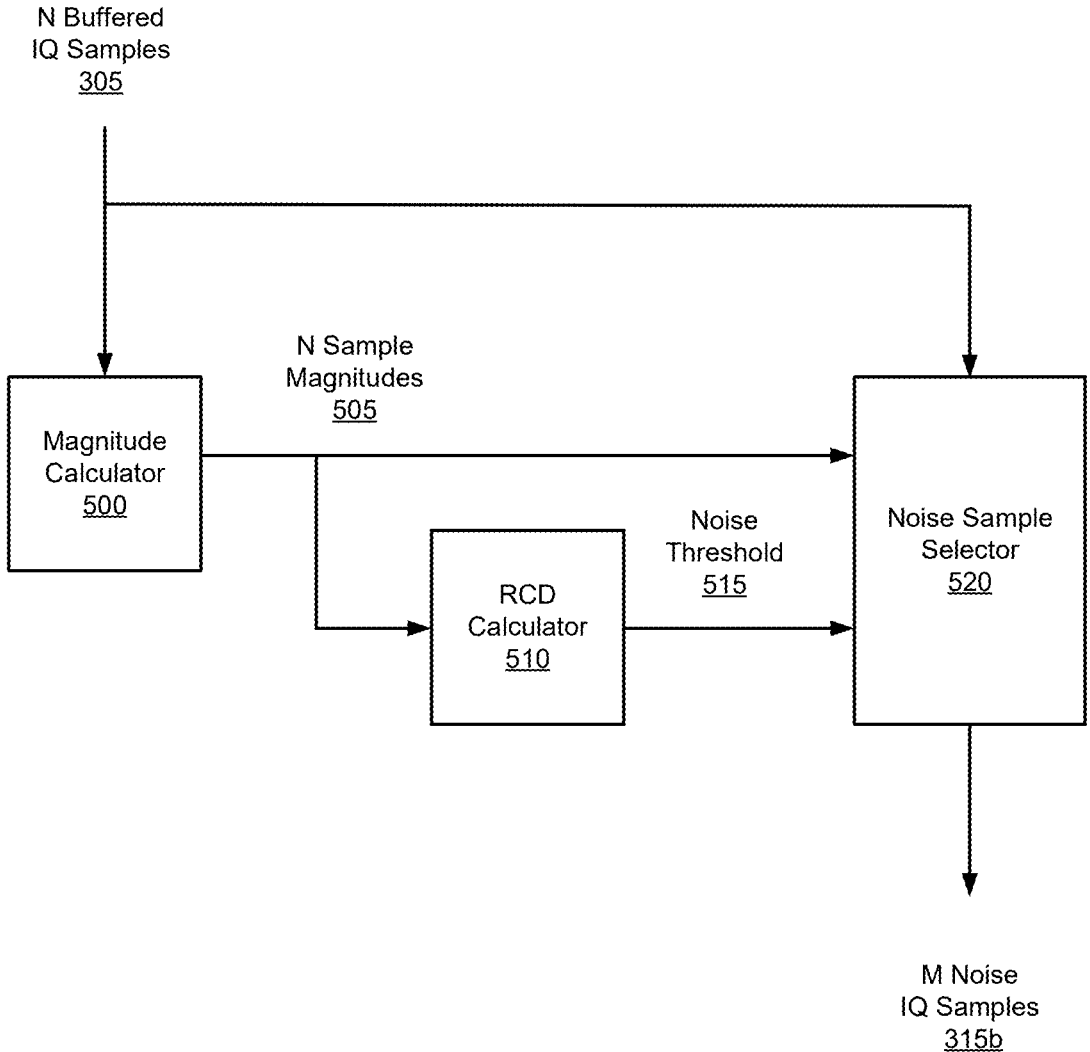
FIG. 5 is a block diagram of another noise floor estimator of the radar blanking system of FIG. 2, configured in accordance with certain embodiments of the present disclosure.

FIG. 5 is a block diagram of another noise floor estimator 310*b* of the radar blanking system 150 of FIG. 3, configured in accordance with certain embodiments of the present disclosure. The noise floor estimator 310*b* is shown to include a magnitude calculator 500, a Rayleigh cumulative distribution (RCD) calculator 510, and a noise sample selector 520.

The magnitude calculator 500 is configured to calculate N sample magnitudes 505 of the N buffered IQ input signal samples 305 of the segment (e.g., of the blanking duration interval).

The RCD calculator 510 is configured to calculate a noise threshold 515 based on the RCD of the calculated magnitudes. In some embodiments, the RCD based noise threshold 515 is calculated as:

$$\sigma_x^2 = \frac{\sum_{i=1}^{N} |x_i|^2}{2N}$$

$$NT^2 = -1 * \left( \log\left(1 - \frac{M}{N}\right) \right) * 2\sigma_x^2$$

$$NT = \sqrt{NT^2}$$

where $x_i$ are the IQ input signal samples 305 and NT is the calculated noise threshold 515.

The noise sample selector 520 is configured to extract the noise samples from the N buffered IQ input signal samples 305 based on a comparison of the calculated magnitudes 505 to the noise threshold 515, to generate the M noise IQ samples 315*b*. For example, if the magnitude of an IQ sample 305 is less than the noise threshold 515, then that IQ sample is selected as one of the noise samples 315*b*, for storage in the noise sample buffer 320.

The first noise floor estimator 310*a* may provide the best results but incurs a larger computational cost due to the sorting operation to determine the noise threshold 425. The second noise floor estimator 310*b* avoids the cost associated with sorting and may provide results that are nearly as good through the use of the RCD based noise threshold 515.

Figure 6:
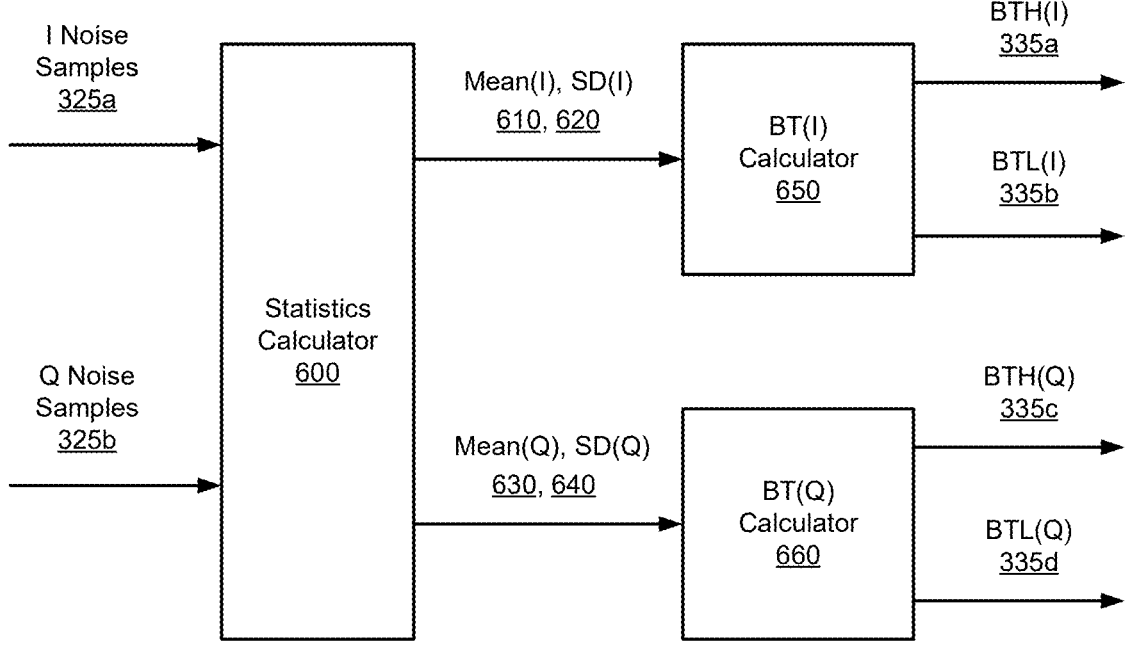
FIG. 6 is a block diagram of the blanking threshold calculator of the radar blanking system of FIG. 3, configured in accordance with certain embodiments of the present disclosure.

FIG. 6 is a block diagram of the blanking threshold calculator 330 of the radar blanking system 150 of FIG. 3, configured in accordance with certain embodiments of the present disclosure. The blanking threshold calculator 330 is configured to calculate the blanking thresholds 335 as offsets from the mean of the noise samples, the offsets proportional to the standard deviation of the noise samples. The blanking threshold calculator 330 is shown to include a statistics calculator 600, an in-phase channel blanking threshold calculator 650, and a quadrature channel blanking threshold calculator 660.

The statistics calculator 600 is configured to calculate the mean 610 and the standard deviation 620 of the M in-phase (or real component) noise samples 325*a*, stored in the noise sample buffer 320. The statistics calculator 600 is also configured to calculate the mean 630 and the standard deviation 640 of the M quadrature phase (or imaginary component) noise samples 325*b*, stored in the noise sample buffer 320.

The in-phase channel blanking threshold calculator 650 is configured to calculate the in-phase channel blanking high threshold 335*a* and low threshold 335*b*. The high threshold 335*a* and low threshold 335*b* define a range such that in-phase samples which lie outside of that range will be blanked. The in-phase high threshold 335*a* is calculated by adding an in-phase offset value to the in-phase mean 610. The in-phase offset value is determined by multiplying the in-phase standard deviation 620 by a scale factor X. In some embodiments, the scale factor X is empirically determined, for example based on simulations to determine a value that achieves desired blanking. The in-phase low threshold 335*b* is calculated by subtracting the in-phase offset value from the in-phase mean 610.

The quadrature channel blanking threshold calculator 660 is configured to calculate the quadrature channel blanking high threshold 335*c* and low threshold 335*d*. The high threshold 335*c* and low threshold 335*d* define a range such that quadrature phase samples which lie outside of that range will be blanked. The quadrature phase high threshold 335*c* is calculated by adding a quadrature phase offset value to the quadrature phase mean 630. The quadrature phase offset value is determined by multiplying the quadrature phase standard deviation 640 by the scale factor X. The quadrature phase low threshold 335*d* is calculated by subtracting the quadrature phase offset value from the quadrature phase mean 630.

Figure 7:
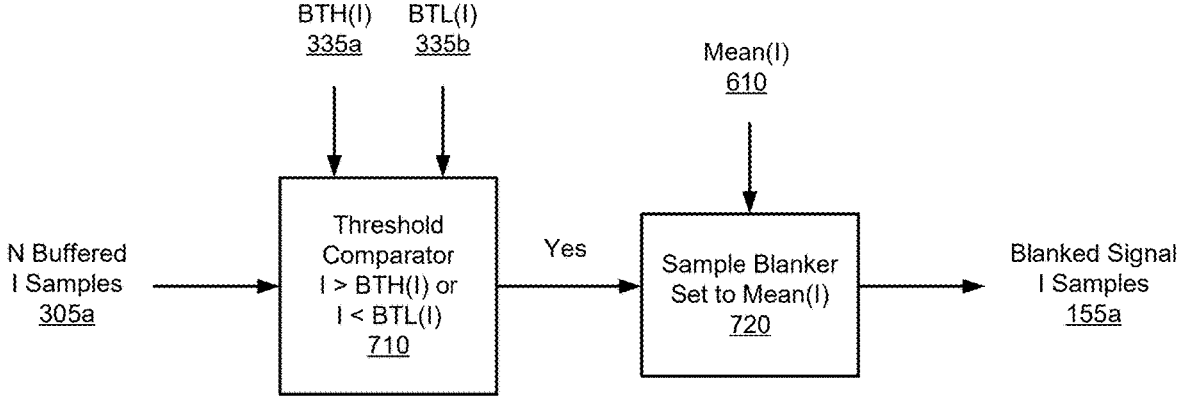
FIG. 7 is a block diagram of the blanking processor of the radar blanking system of FIG. 3, configured in accordance with certain embodiments of the present disclosure.
Figure 7:
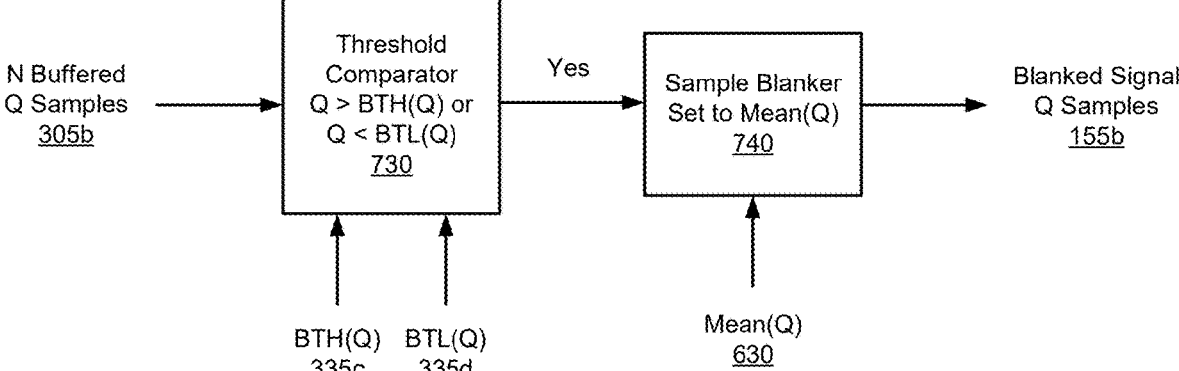

FIG. 7 is a block diagram of the blanking processor 340 of the radar blanking system 150 of FIG. 3, configured in accordance with certain embodiments of the present disclosure. The blanking processor 340 is configured to select a subset of the IQ input signal samples 305 that lie outside of the blanking threshold ranges 335 and replace those samples with the mean of the noise samples to generate the blanked signal 155. The blanking processor 340 is shown to include an in-phase channel threshold comparator 710, an in-phase sample blanker 720, a quadrature channel threshold comparator 730, and a quadrature sample blanker 740.

The in-phase channel threshold comparator 710 is configured to compare the in-phase component of the N buffered IQ input signal samples 305*a* to the in-phase channel blanking high threshold 335*a* and the in-phase channel blanking low threshold 335*b*. If the in-phase component is greater than the high threshold 335*a* or less than the low threshold 335*b*, then that in-phase component sample is determined to be corrupted by the interfering signal 115.

The in-phase sample blanker 720 is configured to replace the in-phase samples that are determined to be corrupted by the interfering signal with the mean 610 of the in-phase noise samples, to generate the blanked signal in-phase samples 155*a*.

The quadrature channel threshold comparator 730 is configured to compare the quadrature phase component of the N buffered IQ input signal samples 305*b* to the quadrature phase channel blanking high threshold 335*c* and the quadrature phase channel blanking low threshold 335*d*. If the quadrature phase component is greater than the high threshold 335*c* or less than the low threshold 335*d*, then that quadrature phase component sample is determined to be corrupted by the interfering signal 115.

The quadrature sample blanker 740 is configured to replace the quadrature phase samples that are determined to be corrupted by the interfering signal with the mean 630 of the quadrature phase noise samples, to generate the blanked signal quadrature phase samples 155*b*.

Methodology

Figure 8:
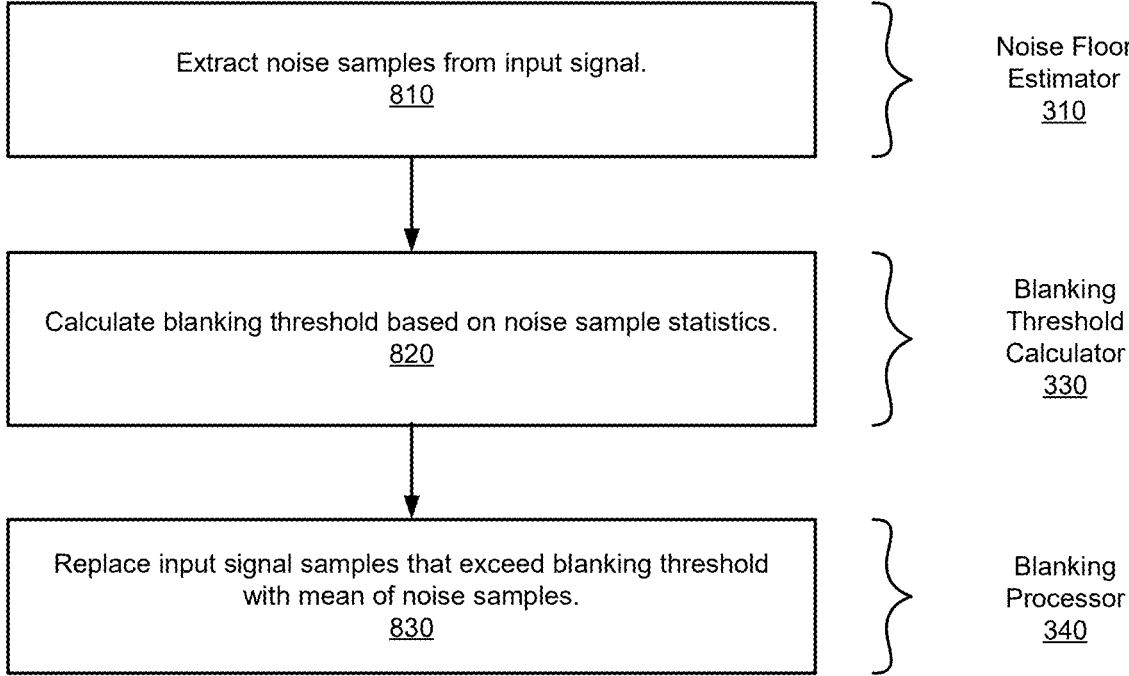
FIG. 8 is a flowchart illustrating a methodology for radar blanking, in accordance with an embodiment of the present disclosure.

FIG. 8 is a flowchart illustrating a methodology 800 for radar blanking, in accordance with an embodiment of the present disclosure. As can be seen, example method 800 includes a number of phases and sub-processes, the sequence of which may vary from one embodiment to another. However, when considered in aggregate, these phases and sub-processes form a process for radar blanking using dynamic subinterval noise floor estimation, in accordance with certain of the embodiments disclosed herein, for example as illustrated in FIGS. 1-7, as described above. However other system architectures can be used in other embodiments, as will be apparent in light of this disclosure. To this end, the correlation of the various functions shown in FIG. 8 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 800 commences, at operation 810, by extracting noise samples from a segment of IQ input signal samples. In some embodiments, the segment is a blanking duration interval of length N samples. In some embodiments, the noise samples to be extracted are identified by sorting the magnitudes of the IQ input samples and selecting a number M of the IQ input samples associated with the M smallest magnitudes. In some embodiments, the number of noise samples M is a noise floor subinterval which may be selected based on the duty cycle of the interfering signal.

In some embodiments, the noise samples to be extracted are identified by comparison of the magnitudes of the IQ input samples to a calculated noise threshold, the noise threshold based on a Rayleigh cumulative distribution of the magnitudes of the IQ input samples.

At operation 820, blanking thresholds are calculated for the I and Q channels based on statistics of the noise samples. The statistics include a mean of the noise samples and a standard deviation of the noise samples. In some embodiments, high blanking thresholds and low blanking threshold are calculated for the I and Q channels as offsets to the mean values of the I samples and the Q samples. The offsets may be set to a product of a scale factor X and the standard deviation (of the I and Q noise samples). In some embodiments, the scale factor X is empirically determined, for example based on simulations to determine a value that achieves desired blanking.

At operation 830, a subset of the IQ input signal samples is selected for replacement with the mean of the noise samples to generate a blanked signal. The samples selected for replacement are those samples that exceed the blanking threshold.

In some embodiments, additional operations may be performed, as previously described in connection with the system. For example, the blanking duration interval of length N samples may be based on a repetition interval of an interfering signal to be blanked. In some embodiments, the number of extracted noise samples M corresponds to a noise floor subinterval which may be selected based on the duty cycle of the interfering signal to be blanked. In some embodiments, M is selected so that the ratio of M to N is in the range of 0.7 to 0.8.

EXAMPLE SYSTEM

Figure 9:
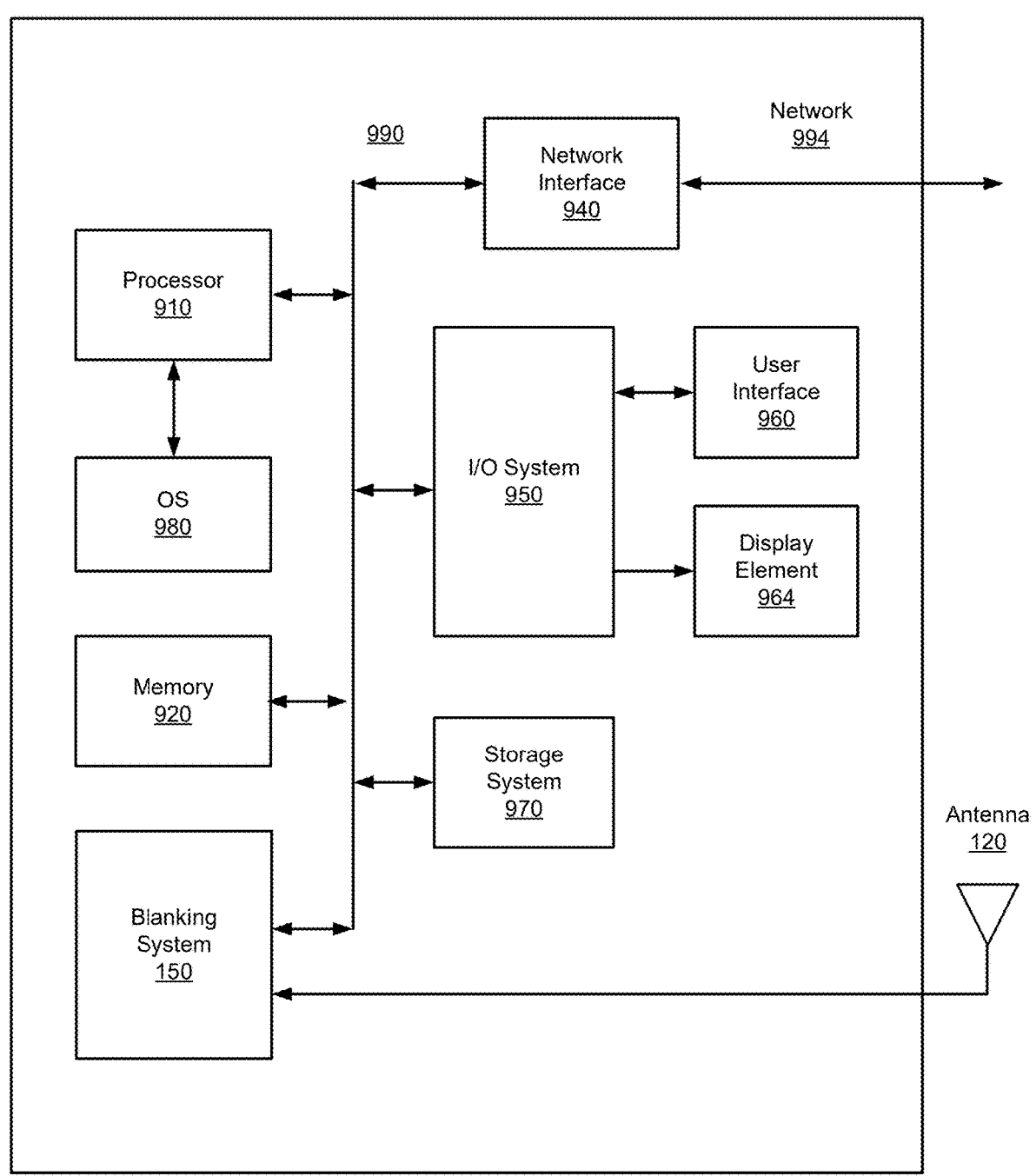
FIG. 9 is a block diagram of a processing platform configured to provide radar blanking, in accordance with an embodiment of the present disclosure.

FIG. 9 is a block diagram of a processing platform 900 configured to provide radar blanking, in accordance with an embodiment of the present disclosure. In some embodiments, platform 900, or portions thereof, may be hosted on, or otherwise be incorporated into the electronic systems of an aircraft, ship, ground station, or man-portable system deployment.

In some embodiments, platform 900 may comprise any combination of a processor 910, memory 920, a network interface 940, an input/output (I/O) system 950, a user interface 960, a display element 964, a storage system 970, radar blanking system 150, and one or more antennas 120. As can be further seen, a bus and/or interconnect 990 is also provided to allow for communication between the various components listed above and/or other components not shown. Platform 900 can be coupled to a network 994 through network interface 940 to allow for communications with other computing devices, platforms, devices to be controlled, or other resources. Other componentry and functionality not reflected in the block diagram of FIG. 9 will be apparent in light of this disclosure, and it will be appreciated that other embodiments are not limited to any particular hardware configuration.

Processor 910 can be any suitable processor, and may include one or more coprocessors or controllers, such as an audio processor, a graphics processing unit, or hardware accelerator, to assist in the execution of mission software and/or any control and processing operations associated with platform 900, including operation of the radar blanking system 150. In some embodiments, the processor 910 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multi-threaded cores in that they may include more than one hardware thread context (or "logical processor") per core. Processor 910 may be implemented as a complex instruction set computer (CISC) or a reduced instruction set computer (RISC) processor. In some embodiments, processor 910 may be configured as an x86 instruction set compatible processor.

Memory 920 can be implemented using any suitable type of digital storage including, for example, flash memory and/or random access memory (RAM). In some embodiments, the memory 920 may include various layers of memory hierarchy and/or memory caches as are known to those of skill in the art. Memory 920 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 910 may be configured to execute an Operating System (OS) 980 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 900, and therefore may also be implemented using any suitable existing or subsequently-developed platform.

Network interface circuit 940 can be any appropriate network chip or chipset which allows for wired and/or wireless connection between other components of platform 900 and/or network 994, thereby enabling platform 900 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 950 may be configured to interface between various I/O devices and other components of platform 900. I/O devices may include, but not be limited to, user interface 960 and display element 964. User interface 960 may include devices (not shown) such as a touchpad, cockpit display unit, keyboard, and mouse, etc., for example, to allow the user to control the system. Display element 964 may be configured to display information to a user. I/O system 950 may include a graphics subsystem configured to perform processing of images for rendering on the display element 964. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 910 or any chipset of platform 900.

It will be appreciated that in some embodiments, the various components of platform 900 may be combined or integrated in a system-on-a-chip (SoC) architecture. In some embodiments, the components may be hardware components, firmware components, software components or any suitable combination of hardware, firmware, or software.

Radar blanking system 150 is configured to perform radar blanking using dynamic subinterval noise floor estimation, as described previously. Radar blanking system 150 may include any or all of the circuits/components illustrated in FIGS. 3-6, as described above. These components can be implemented or otherwise used in conjunction with a variety of suitable software and/or hardware that is coupled to or that otherwise forms a part of platform 900. These components can additionally or alternatively be implemented or otherwise used in conjunction with user I/O devices that are capable of providing information to, and receiving information and commands from, a user.

In various embodiments, platform 900 may be implemented as a wireless system, a wired system, or a combination of both. When implemented as a wireless system, platform 900 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 900 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 994. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 900 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random-access memory (RAM), or a combination of memories. In alternative embodiments, the components and/ or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/ output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a radar blanking system comprising: a noise floor estimator configured to extract noise samples from a segment of in-phase (I) and quadrature (Q) input signal samples; a blanking threshold calculator configured to calculate blanking thresholds based on statistics of the noise samples, the statistics including a mean of the noise samples and a standard deviation of the noise samples; and a blanking processor configured to select a subset of the IQ input signal samples that exceed the blanking thresholds and replace the selected subset of the IQ input signal samples with the mean of the noise samples to generate a blanked signal.

Example 2 includes the system of Example 1, wherein the noise floor estimator comprises: a magnitude calculator configured to calculate magnitudes of the IQ input signal samples of the segment; a sorting processor configured to sort the calculated magnitudes; a noise threshold calculator configured to calculate a noise threshold based on a number, M, of smallest calculated magnitudes from the sorted calculated magnitudes; and a noise sample selector configured to extract the noise samples from the segment based on a comparison of the calculated magnitudes to the noise threshold.

Example 3 includes the system of Examples 1 or 2, wherein the noise floor estimator comprises: a magnitude calculator configured to calculate magnitudes of the IQ input signal samples of the segment; a Rayleigh cumulative distribution (RCD) calculator configured to calculate a noise threshold based on the RCD of the calculated magnitudes; and a noise sample selector configured to extract the noise samples from the segment based on a comparison of the calculated magnitudes to the noise threshold.

Example 4 includes the system of any of Examples 1-3, wherein the blanking threshold calculator is configured to calculate the blanking thresholds as an offset from the mean of the noise samples, the offset proportional to the standard deviation of the noise samples.

Example 5 includes the system of any of Examples 1-4, wherein the segment is a blanking duration interval of length N samples, and the blanking duration interval is based on a repetition interval of an interfering signal to be blanked.

Example 6 includes the system of Example 5, wherein the noise floor estimator is configured to extract a number, M, of noise samples from the segment of IQ input signal samples, wherein M is a noise floor subinterval, and M is selected based on a duty cycle of the interfering signal.

Example 7 includes the system of Example 6, wherein M is selected so that a ratio of M to N is in a range of 0.7 to 0.8.

Example 8 is a computer program product including one or more non-transitory machine-readable mediums encoded with instructions that when executed by one or more processors cause a process to be carried out for radar blanking, the process comprising: extracting noise samples from a segment of in-phase (I) and quadrature (Q) input signal samples; calculating blanking thresholds based on statistics of the noise samples, the statistics including a mean of the noise samples and a standard deviation of the noise samples; and selecting a subset of the IQ input signal samples that exceed the blanking thresholds and replacing the selected subset of the IQ input signal samples with the mean of the noise samples to generate a blanked signal.

Example 9 includes the computer program product of Example 8, wherein the process comprises: calculating magnitudes of the IQ input signal samples of the segment; sorting the calculated magnitudes; calculating a noise threshold based on a number, M, of smallest calculated magnitudes from the sorted calculated magnitudes; and extracting the noise samples from the segment, based on a comparison of the calculated magnitudes to the noise threshold.

Example 10 includes the computer program product of Examples 8 or 9, wherein the process comprises: calculating magnitudes of the IQ input signal samples of the segment;

calculating a noise threshold based on a Rayleigh cumulative distribution (RCD) of the calculated magnitudes; and extracting the noise samples from the segment based on a comparison of the calculated magnitudes to the noise threshold.

Example 11 includes the computer program product of any of Examples 8-10, wherein the process comprises calculating the blanking thresholds as an offset from the mean of the noise samples, the offset proportional to the standard deviation of the noise samples.

Example 12 includes the computer program product of any of Examples 8-11, wherein the segment is a blanking duration interval of length N samples, and the blanking duration interval is based on a repetition interval of an interfering signal to be blanked.

Example 13 includes the computer program product of Example 12, wherein a number, M, of the extracted noise samples from the segment of IQ input signal samples, is a noise floor subinterval, and M is selected based on a duty cycle of the interfering signal.

Example 14 includes the computer program product of Example 13, wherein M is selected so that a ratio of M to N is in a range of 0.7 to 0.8.

Example 15 is a method for radar blanking, the method comprising: extracting noise samples from a segment of in-phase (I) and quadrature (Q) input signal samples; calculating blanking thresholds based on statistics of the noise samples, the statistics including a mean of the noise samples and a standard deviation of the noise samples; and selecting a subset of the IQ input signal samples that exceed the blanking thresholds and replacing the selected subset of the IQ input signal samples with the mean of the noise samples to generate a blanked signal.

Example 16 includes the method of Example 15, comprising: calculating magnitudes of the IQ input signal samples of the segment; sorting the calculated magnitudes; calculating a noise threshold based on a number, M, of smallest calculated magnitudes from the sorted calculated magnitudes; and extracting the noise samples from the segment, based on a comparison of the calculated magnitudes to the noise threshold.

Example 17 includes the method of Examples 15 or 16, comprising: calculating magnitudes of the IQ input signal samples of the segment; calculating a noise threshold based on a Rayleigh cumulative distribution (RCD) of the calculated magnitudes; and extracting the noise samples from the segment based on a comparison of the calculated magnitudes to the noise threshold.

Example 18 includes the method of any of Examples 15-17, wherein the process comprises calculating the blanking thresholds as an offset from the mean of the noise samples, the offset proportional to the standard deviation of the noise samples.

Example 19 includes the method of any of Examples 15-18, wherein the segment is a blanking duration interval of length N samples, and the blanking duration interval is based on a repetition interval of an interfering signal to be blanked.

Example 20 includes the method of Example 19, wherein a number, M, of the extracted noise samples from the segment of IQ input signal samples, is a noise floor subinterval, and M is selected based on a duty cycle of the interfering signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A radar blanking system comprising:
a noise floor estimator configured to extract noise samples from a segment of in-phase (I) and quadrature (Q) input signal samples;
a blanking threshold calculator configured to calculate blanking thresholds based on statistics of the noise samples, the statistics including a mean of the noise samples and a standard deviation of the noise samples; and
a blanking processor configured to select a subset of the IQ input signal samples that exceed the blanking thresholds and replace the selected subset of the IQ input signal samples with the mean of the noise samples to generate a blanked signal.

2. The system of claim 1, wherein the noise floor estimator comprises:
a magnitude calculator configured to calculate magnitudes of the IQ input signal samples of the segment;
a sorting processor configured to sort the calculated magnitudes;
a noise threshold calculator configured to calculate a noise threshold based on a number, M, of smallest calculated magnitudes from the sorted calculated magnitudes; and
a noise sample selector configured to extract the noise samples from the segment based on a comparison of the calculated magnitudes to the noise threshold.

3. The system of claim 1, wherein the noise floor estimator comprises:
a magnitude calculator configured to calculate magnitudes of the IQ input signal samples of the segment;
a Rayleigh cumulative distribution (RCD) calculator configured to calculate a noise threshold based on the RCD of the calculated magnitudes; and
a noise sample selector configured to extract the noise samples from the segment based on a comparison of the calculated magnitudes to the noise threshold.

4. The system of claim 1, wherein the blanking threshold calculator is configured to calculate the blanking thresholds as an offset from the mean of the noise samples, the offset proportional to the standard deviation of the noise samples.

5. The system of claim 1, wherein the segment is a blanking duration interval of length N samples, and the blanking duration interval is based on a repetition interval of an interfering signal to be blanked.

6. The system of claim 5, wherein the noise floor estimator is configured to extract a number, M, of noise samples from the segment of IQ input signal samples, wherein M is a noise floor subinterval, and M is selected based on a duty cycle of the interfering signal.

7. The system of claim 6, wherein M is selected so that a ratio of M to N is in a range of 0.7 to 0.8.

8. A computer program product including one or more non-transitory machine-readable mediums encoded with instructions that when executed by one or more processors cause a process to be carried out for radar blanking, the process comprising:
extracting noise samples from a segment of in-phase (I) and quadrature (Q) input signal samples;
calculating blanking thresholds based on statistics of the noise samples, the statistics including a mean of the noise samples and a standard deviation of the noise samples; and
selecting a subset of the IQ input signal samples that exceed the blanking thresholds and replacing the selected subset of the IQ input signal samples with the mean of the noise samples to generate a blanked signal.

9. The computer program product of claim 8, wherein the process comprises:
calculating magnitudes of the IQ input signal samples of the segment;
sorting the calculated magnitudes;
calculating a noise threshold based on a number, M, of smallest calculated magnitudes from the sorted calculated magnitudes; and
extracting the noise samples from the segment, based on a comparison of the calculated magnitudes to the noise threshold.

10. The computer program product of claim 8, wherein the process comprises:
calculating magnitudes of the IQ input signal samples of the segment;
calculating a noise threshold based on a Rayleigh cumulative distribution (RCD) of the calculated magnitudes; and
extracting the noise samples from the segment based on a comparison of the calculated magnitudes to the noise threshold.

11. The computer program product of claim 8, wherein the process comprises calculating the blanking thresholds as an offset from the mean of the noise samples, the offset proportional to the standard deviation of the noise samples.

12. The computer program product of claim 8, wherein the segment is a blanking duration interval of length N samples, and the blanking duration interval is based on a repetition interval of an interfering signal to be blanked.

13. The computer program product of claim 12, wherein a number, M, of the extracted noise samples from the segment of IQ input signal samples, is a noise floor subinterval, and M is selected based on a duty cycle of the interfering signal.

14. The computer program product of claim 13, wherein M is selected so that a ratio of M to N is in a range of 0.7 to 0.8.

15. A method for radar blanking, the method comprising:
extracting noise samples from a segment of in-phase (I) and quadrature (Q) input signal samples;
calculating blanking thresholds based on statistics of the noise samples, the statistics including a mean of the noise samples and a standard deviation of the noise samples; and
selecting a subset of the IQ input signal samples that exceed the blanking thresholds and replacing the selected subset of the IQ input signal samples with the mean of the noise samples to generate a blanked signal.

16. The method of claim 15, comprising:

calculating magnitudes of the IQ input signal samples of the segment;

sorting the calculated magnitudes;

calculating a noise threshold based on a number, M, of smallest calculated magnitudes from the sorted calculated magnitudes; and extracting the noise samples from the segment, based on a comparison of the calculated magnitudes to the noise threshold.

17. The method of claim 15, comprising:

calculating magnitudes of the IQ input signal samples of the segment;

calculating a noise threshold based on a Rayleigh cumulative distribution (RCD) of the calculated magnitudes; and extracting the noise samples from the segment based on a comparison of the calculated magnitudes to the noise threshold.

18. The method of claim 15, wherein the process comprises calculating the blanking thresholds as an offset from the mean of the noise samples, the offset proportional to the standard deviation of the noise samples.

19. The method of claim 15, wherein the segment is a blanking duration interval of length N samples, and the blanking duration interval is based on a repetition interval of an interfering signal to be blanked.

20. The method of claim 19, wherein a number, M, of the extracted noise samples from the segment of IQ input signal samples, is a noise floor subinterval, and M is selected based on a duty cycle of the interfering signal.

* * * * *